United States Patent
Lee et al.

(10) Patent No.: US 10,079,744 B2
(45) Date of Patent: Sep. 18, 2018

(54) IDENTIFYING A COMPONENT WITHIN AN APPLICATION EXECUTED IN A NETWORK

(71) Applicant: Hewlett Packard Enterprise Development LP, Houston, TX (US)

(72) Inventors: Jung Gun Lee, Palo Alto, CA (US); Yoshio Turner, Palo Alto, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 258 days.

(21) Appl. No.: 15/114,872

(22) PCT Filed: Jan. 31, 2014

(86) PCT No.: PCT/US2014/014174
§ 371 (c)(1),
(2) Date: Jul. 28, 2016

(87) PCT Pub. No.: WO2015/116169
PCT Pub. Date: Aug. 6, 2015

(65) Prior Publication Data
US 2017/0005900 A1 Jan. 5, 2017

(51) Int. Cl.
*G06F 15/173* (2006.01)
*H04L 12/26* (2006.01)
(Continued)

(52) U.S. Cl.
CPC ...... *H04L 43/0894* (2013.01); *H04L 12/4641* (2013.01); *H04L 12/4695* (2013.01); *H04L 12/6418* (2013.01); *H04L 41/0896* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS 6,647,419 B1  11/2003  Mogul
7,577,091 B2  8/2009  Antal et al.
(Continued)

FOREIGN PATENT DOCUMENTS

WO    WO-2013158115 A1    10/2013

OTHER PUBLICATIONS

Choreo: Network-Aware Task Placement for Cloud Applications—Authors Katrina LaCurts, Shuo Deng, Ameesh Goyal, Hari Balakrishnan—MIT Computer Science and Artificial Intelligence Lab—Cambridge, Massachusetts, U.S.A. {katrina, shuodeng, ameesh, hari}@csail.mit.edu—Retrieved date Jul. 21, 2016—13 pages.
(Continued)

*Primary Examiner* — Quang N Nguyen
(74) *Attorney, Agent, or Firm* — Hewlett Packard Enterprise Patent Department

(57) ABSTRACT

Identifying a component within an application executed in a network includes obtaining a traffic matrix, the traffic matrix defining a rate for which packets of data are exchanged between VMs corresponding to an application, analyzing the traffic matrix to identify VMs within a component, modifying the traffic matrix to create a modified traffic matrix, and defining, for the application, a tenant application graph (TAG) model based on the modified traffic matrix.

10 Claims, 6 Drawing Sheets

(51) Int. Cl.
  *H04L 12/64* (2006.01)
  *H04L 12/46* (2006.01)
  *H04L 12/24* (2006.01)

(56) References Cited

U.S. PATENT DOCUMENTS

| | | | |
|---|---|---|---|
| 7,861,247 B1 | 12/2010 | Santos et al. | |
| 8,145,760 B2* | 3/2012 | Dinda | G06F 9/4887 709/226 |
| 8,478,878 B2* | 7/2013 | Freimuth | G06F 9/45558 709/223 |
| 8,862,744 B2* | 10/2014 | Garg | H04L 43/0882 709/203 |
| 2003/0158765 A1 | 8/2003 | Ngi et al. | |
| 2007/0192482 A1 | 8/2007 | Smith et al. | |
| 2008/0155537 A1 | 6/2008 | Dinda et al. | |
| 2008/0219253 A1 | 9/2008 | Pozhenko et al. | |
| 2009/0052320 A1 | 2/2009 | Ling et al. | |
| 2010/0027420 A1 | 2/2010 | Smith | |
| 2011/0019531 A1 | 1/2011 | Kim et al. | |
| 2011/0296052 A1 | 12/2011 | Guo et al. | |
| 2013/0014101 A1 | 1/2013 | Ballani et al. | |
| 2013/0031545 A1 | 1/2013 | Choudhury et al. | |
| 2013/0031559 A1 | 1/2013 | Alicherry | |
| 2013/0212578 A1 | 8/2013 | Garg et al. | |
| 2013/0227558 A1 | 8/2013 | Du et al. | |

OTHER PUBLICATIONS

FairCloud: Sharing the Network in Cloud Computing—Authors: Lucian Popa—Gautam Kumar—Mosharaf Chowdhury—Arvind Krishnamurthy—Sylvia Ratnasamy—Ion Stoica. Dated: Aug. 13-17, 2013, 12 Pages.
ISR of PCT Appl. No. PCT/US2014/014174—Dated Feb. 24, 2015—5 pages.
Online Traffic-aware Virtual Machine Placement in Data Center Network—Authors: Daniel S. Dias and Lu'is Henrique M. K. Costa—Universidade Federal do Rio de Janeiro—GTA/COPPE/UFRJ—Rio de Janeiro, Brazil Email: {dias, luish}@gta.ufrj.br—Retrieved date: Jul. 21, 2016—8 pages.
"Storm: Distributed and fault-tolerant realtime computation," Apr. 12, 2013, pp. 1-2, storm-project.net.
D. Dias and L. Costa, "Online Traffic-aware Virtual Machine Placement in Data Center Networks," Dec. 4, 2012, pp. 1-8.
EPO; "Supplementary European Search Report" cited in App. No. EP13877091; dated Sep. 30, 2016; 7 pages.
Feras Al-Hawari and Elias Manolakos, "A QoS Management System and an Efficient Scheduling Heuristic for Network Computing Applications," 2007, pp. 1-31.
Greg Linden, "Make Data Useful," Nov. 28, 2006, pp. 1-11, amazon.com and Findory.
Hitesh Ballani et al., "Towards Predictable Datacenter Networks," SIGCOMM'11, Aug. 15-19, 2011, Toronto, Ontario, Canada, pp. 1-12, ACM.
International Search Report and Written Opinion, International Application No. PCT/US2013/029683, dated Dec. 2, 2013, pp. 1-7.
J. Bolliger et al., "Bandwidth Modelling for Network-Aware Applications," 1999, pp. 1300-1309, IEEE.
Jianxiu Hao and James B. Orlin, "A Faster Algorithm for Finding the Minimum Cut in a Directed Graph," 1994, pp. 424-446, Journal of Algorithms 17, Academic Press, Inc.
Katrina Lacurts et al., "Choreo: Network-aware Task Placement for Cloud Applications," IMC'13, Oct. 23-25, 2013, Barcelona, Spain, pp. 1-13, ACM.
Lucian Popa et al., "Faircloud: Sharing the Network in Cloud Computing," SIGCOMM'12, Aug. 13-17, 2012, Helsinki, Finland, pp. 1-12, ACM.
M. Hajjat et al., "Dealer: Application-aware Request Splitting for Interactive Cloud Applications," CoNEXT'12, Dec. 10-13, 2012, Nice, France, pp. 1-12, ACM.
Poirriez et al., a hybrid algorithm for the unbounded knapsack problem, Nov. 11, 2018, Elsevier.com, pp. 1-15.
Virajith Jalaparti et al., "Bridging the Tenant-Provider Gap in Cloud Services," SOCC'12, Oct. 14-17, 2012, San Jose, CA USA, pp. 1-14, ACM.

* cited by examiner

IDENTIFYING A COMPONENT WITHIN AN APPLICATION EXECUTED IN A NETWORK

BACKGROUND

Virtualized Network services have grown immensely in popularity. Users may be provided with access to applications and data storage on the network without having to worry about the infrastructure and platforms that run the user's applications and store the user's data. In some cases, users, such as tenants, may negotiate with the network service provider to guarantee certain performance of their applications so they can operate with the desired level of service.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
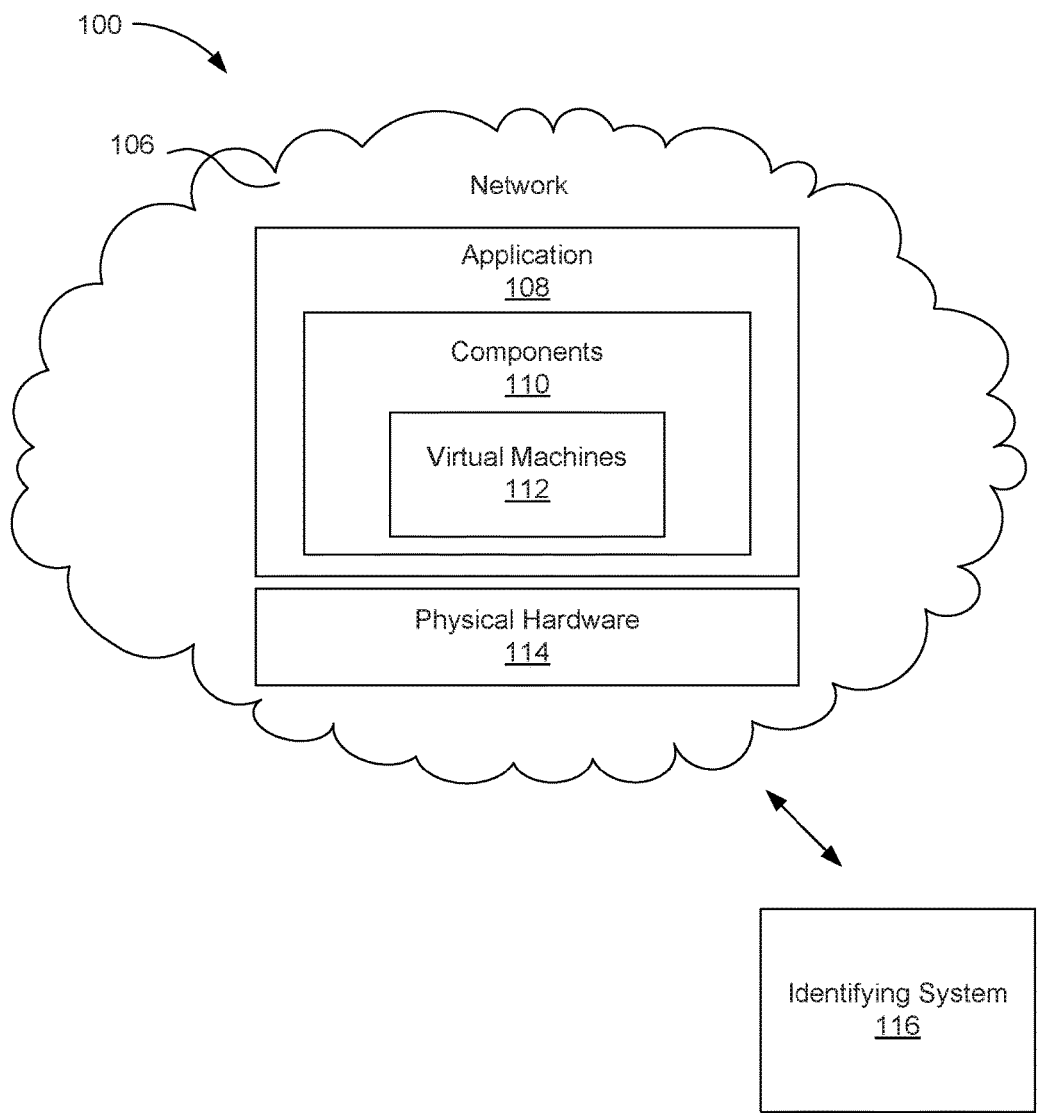
FIG. 1 is a diagram of an example of a system for identifying components of an application and a communication pattern between the components within an application executed in a network, according to one example of principles described herein.

Understanding communication patterns of a user using an application is essential to provision network services for the users. By provisioning the network services for the users, the network services meet the application criteria while efficiently managing the network resources.

Often, network service providers do not offer guarantees for the network bandwidth in network datacenters or enterprise networks. As a result, this prevents the users from running their applications predictably. Since many applications have stringent network criteria, network service providers that host these applications tend to overprovision network bandwidth to satisfy application criteria by configuring each tenant's network individually. Further, public network service providers offer very little network performance predictability for a specific tenant. As a result, network resources, such as bandwidth, are not efficiently managed.

The principles described herein include a method for identifying a component within an application executed in a network. Such a method includes obtaining a traffic matrix, the traffic matrix defining a rate for which packets of data are exchanged between virtual machines (VMs) corresponding to an application, modifying the traffic matrix to create a modified traffic matrix, and defining, for the application, a tenant application graph (TAG) model based on the modified traffic matrix. Such a method takes a tenants traffic matrix, identifies the components and the traffic between the components, and creates a TAG model. Further, such a method allows the network service providers to manage network resources, such a bandwidth in an efficient manner. As a result, the network service providers provide reliable and predictable network performance.

In the present specification and in the appended claims, the term "tenant application graph (TAG) model" is meant to be understood broadly as a model to describe bandwidth that are utilized by applications. The TAG model, for example, provides a way to describe the bandwidth utilized by an application and the described bandwidths may be reserved on physical links in a network to guarantee those bandwidths for the application. In one example, the TAG model may model the actual communication patterns of an application, such as between components of an application, rather than modeling the topology of the underlying physical network which would have the same model for all the applications running on the network.

In the present specification and in the appended claims, the term "clique" is meant to be understood broadly as a number of VMs clustered together. In one example, a clique may include a number of VMs having the same communication pattern. In another example, a clique may include a number of VMs having a similar communication pattern.

In the present specification and in the appended claims, the term "application" is meant to be understood broadly as a program executed for an end user, such as a tenant. In one example, an application may be an enterprise application. Further, an application may include a number of components.

In the present specification and in the appended claims, the term "component" is meant to be understood broadly as a function performed by an application. In one example, a component may be a tier, a webserver tier, or a business logic tier. Further, components may be executed on a number of VMs.

In the present specification and in the appended claims, the term "virtual machine" is meant to be understood broadly as a program running on physical hardware designed to emulate a specific set of hardware. In one example, several VMs may be placed on the physical hardware.

In the present specification and in the appended claims, the term "communication pattern" is meant to be understood broadly as a predictable rate for which information is exchanged in groups of VMs in which all pairs of VMs in the group of VMs communicate with each other.

In the present specification and in the appended claims, the term "traffic matrix" is meant to be understood broadly as entries of numbers, symbols, or expressions arranged in rows and columns. Further, the entries in the traffic matrix represent a rate at which packets of data are exchanged between VM of a component within an application.

In the present specification and in the appended claims, the term "rate" is meant to be understood broadly as a speed at which packets of data are exchanged between two VMs corresponding to two components within an application. In one example, the rate may be measured in megabits per second (Mbps). In another example, the rate may be measured in kilobits per second (Kbps). In yet another example, the rate may be measured in any appropriate unit.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for identifying components of an application and a communication pattern between the components within an application executed in a network, according to one example of principles described herein. As will be described below, an identifying system is in communication with a network. The identifying system analyzes a VM-level traffic matrix to identify VMs within each component. Further, after the identifying system identifies all the components within an application, the identifying system defines a TAG model.

As illustrated, FIG. 1 includes a network (106). In one example, the network (106) may include physical hardware (114). In one example, the physical hardware (114) may include, among others, processors, memory and other storage devices, servers, and networking equipment including switches and routers. The physical hardware (114) performs the actual computing and networking and data storage.

As illustrated, the users or tenants run applications (108) in the network. The application (108) may be programs executed by end users or tenants. Further, the application (108) may be an enterprise application or any type of application. In one example, the network (106) may receive service requests from computers used by the end users or tenants and perform the desired processes for example by the application (108) and return results to the computers and other devices of the end users for example via the network (106).

Further, the application (108) may include of multiple components (110). In one example, the components (110) are functions performed by an application (108). In one example, a component (110) is a tier, such as a database tier handling storage, a webserver tier handling requests, or a business logic tier executing a business application function. The size and bandwidth demands of the components (110) may vary overtime. Further, the components (110) may include multiple instances of code executing the function or functions of the application (108). The multiple instances the code may be hosted by the VMs (112). The components (110) may alternatively include a single instance of code performing the function of a component and running on a single VM. Each instance may have the same code base and multiple instances and VMs (112) may be used based on demand. By way of example, the components (110) may include multiple webserver instances in a webserver tier to accommodate requests from the end users.

As mentioned above, the components (110) may include a number of VMs (112). In one example, the VMs (112) are programs running on the physical hardware (114) and designed to emulate a specific set of hardware. In one example, several of the VMs (112) may be placed on the physical hardware (114). The VMs (112) may be hosted on servers that are located on different sub-trees in a physical network topology that has the shape of a tree. In one example, the subtrees are optimized for network bandwidth guarantees, for example by minimizing the bandwidth guarantees for links that traverse the core switch in a tree-shaped physical network.

As illustrated, the system (100) includes an identifying system (116). In one example, the identifying system (100) obtains a traffic matrix, the traffic matrix defining a rate for which packets of data are exchanged between VMs (112) corresponding to an application (108). As will be described in other parts of this specification, the rate may be, for example, two Mbps for which packets of data are exchanged between VMs (112).

The identifying system (100) modifies the traffic matrix to create a modified traffic matrix. As will be described in other parts of this specification, the modified traffic matrix may be created by first applying a threshold value to the rates in the original traffic matrix and then using a standard technique of computing the symmetric adjacency matrix.

The identifying system defines, for the application (108), a TAG model based on the modified traffic matrix. In one example, the TAG model models bandwidth for the applications (108). The bandwidth of the TAG model may include estimates of bandwidth that is utilized by the application (108) running in the network (106) to provide a desired level of performance. Further, the TAG model may be represented as a graph including vertices representing the components (110) of the application (108).

While this example has been described with reference to the identifying system being located over the network, the identifying system may be located in any appropriate location according to the principles described herein. For example, the identifying system may be located in a user device, the network, other locations, or combinations thereof. While this example has been described with reference to the network having one application, the network may have several applications. For example, the network may include nine applications. Further, while this example has been described with reference to the application having one component, the application may include several components. For example, the application may include ten components.

Figure 2:
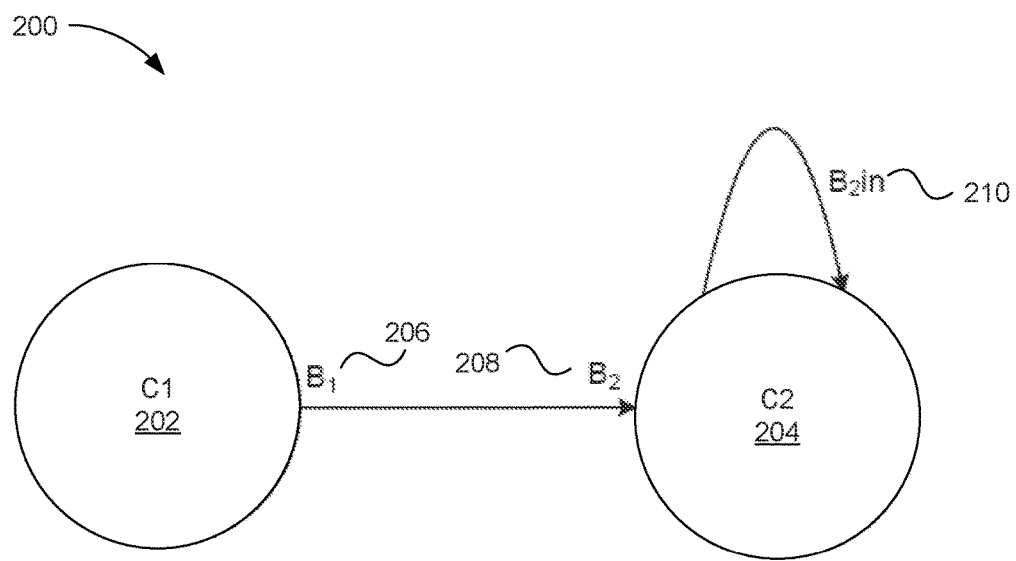
FIG. 2 is a diagram of an example of a Tenant Application Graph (TAG), according to one example of principles described herein.

FIG. 2 is a diagram of an example of a TAG, according to one example of principles described herein. As illustrated in FIG. 2, the TAG (200) is an example of an application with two components C1 (202) and C2 (204). In this example, a directed edge from C1 (202) to C2 (204) is labeled B1 (206) and B2 (208). Thus, each VM in C1 (202) is guaranteed to be able to send at rate (206) to the set of VMs in C2 (204). Similarly, each VM in C2 (204) is guaranteed to be able to receive at rate B2 (208) from the set of VMs in C1 (202). To guarantee the bandwidth, an application bandwidth modeling module models the application with a TAG and a deployment manager determines placement of VMs according to the TAG and reserves bandwidth for the VMs on the links according to the bandwidth, such as B1 (206) and B2

(208). The TAG (200) has a self-edge, $B_2$ in (210) for component C2 (204), describing the bandwidth guarantees for traffic where both source and destination are in C2 (204).

Figure 3:
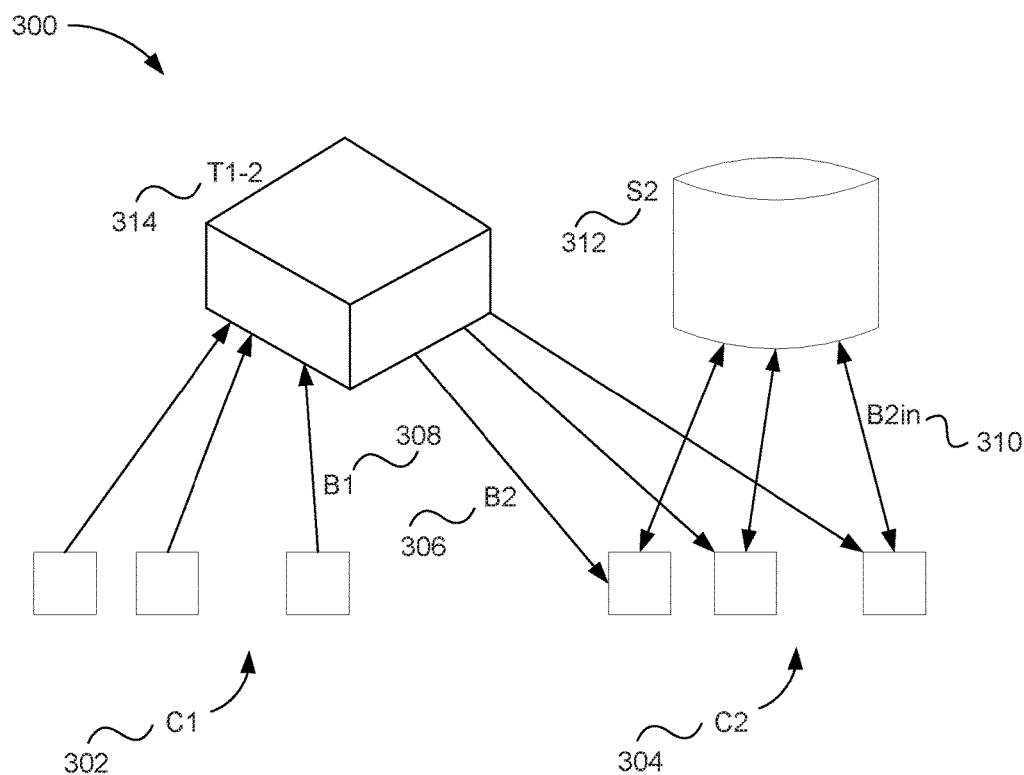
FIG. 3 is a diagram of an example of a detailed illustration of the TAG from FIG. 2, according to one example of principles described herein.

FIG. 3 is a diagram of an example of a detailed illustration of the TAG from FIG. 2, according to one example of principles described herein. In one example, FIG. 3 illustrates an alternative way of visualizing the bandwidth expressed in FIG. 2. To model the bandwidth guarantees between C1 (302) and C2 (304), each VM in C1 (302) is connected to a virtual trunk $T_{1 \to 2}$ (314) by a dedicated directional link of capacity B1 (308). Similarly, virtual trunk $T_{1 \to 2}$ (314) is connected through a directional link of capacity B2 (306) to each VM in C2 (304). The virtual trunk (314) represents directional transmission from C1 (302) to C2 (304) and may be implemented in the physical network by one switch or a network of switches. The TAG (300) example in FIG. 3 has a self-edge for component C2 (304), describing the bandwidth guarantees for traffic where both source and destination are in C2 (304). The self-loop edge in FIG. 3 can be seen as implemented by a virtual switch S2, (312) to which each VM in C2 (304) is connected to a bidirectional link of capacity BP (310). The virtual switch S2 (312) represents bidirectional connectivity. S2 (312) may be implemented by a network switch.

The TAG (300) is easy to use and moreover, since the bandwidth specified in the TAG (300) can be applied from any UM of one component to the VMs of another component, the TAG (300) accommodates dynamic load balancing between application components and dynamic re-sizing of application components, such as flexing. The per-VM bandwidth Se and Re are not changed while component sizes change by flexing.

The TAG (300) can also accommodate middleboxes between the application components. Many types of middleboxes, such as load balancers and security services, examine the traffic in one direction, but not the reverse traffic (e.g., examine queries to database servers but not the replies from servers). The TAG (300) model can accommodate these unidirectional middleboxes as well.

Since queries often consume significantly less bandwidth than responses, the ability to specify directional bandwidths allows a TAG to deploy up to 2× more guarantees than a unidirectional model. For example, a VM with a high outgoing bandwidth can be located on the same server with a VM with a high incoming bandwidth.

Users can identify the per VM guarantees to use in the TAG (300) through measurements or compute them using the processing capacity of the VMs and a workload model.

TAG deployment which may be determined by a deployment manager is now described. Deploying the TAG may include optimizing the placement of VMs on physical servers in the physical hardware while reserving the bandwidth on physical links in a network connecting the VMs. Then, bandwidth may be monitored to enforce the reserved bandwidths.

In one example, VMs are deployed in such a manner that as many VMs are deployed as possible on a tree-shaped physical topology while providing the bandwidth which may be specified by a tenant. The deployment may minimize the bandwidth usage in an oversubscribed network core, assumed to be the bottleneck resource for bandwidth in a tree-shaped network topology. The tree may include a root network switch, intermediate core switches (e.g., aggregation switches) and low-level switches below the core switches and connected to servers that are leaves in subtrees (e.g., top of rack switches). The tree and subtrees may include layer 3 and layer 2 switches. In one example, the smallest feasible subtree of the physical topology is selected for placement of VMs for a TAG. In the chosen subtree, the components that heavily talk to each other are placed under the same child node. Components that have bandwidth greater than a predetermined threshold may be considered heavy talkers. The threshold may be determined as a function of all the requested bandwidths. For example, the highest 20% may be considered "heavy talkers" or a threshold bandwidth amount may be determined from historical analysis of bandwidth. A minimum cut function may be used to determine placement of these components. For example, the placement of these components is finding the minimum capacity cut in a directed network G with n nodes. A minimum cut function may be used to determine the placements. For example, Hao and Orlin disclose a highly-cited minimum-cut function for solving the minimum-cut in Hao, Jianxiu; Orlin, James B. (1994). "A faster algorithm for finding the minimum cut in a directed graph". J. Algorithms 17: 424-446. Other minimum-cut functions may be used.

Components that remain to be placed after the minimum cut phase is completed may try to consume core bandwidth independently of their placement in the subtree. To minimize core bandwidth consumption, the VMs of these remaining components may be placed in a manner that maximizes server consolidation by fully utilizing both link bandwidth and other resources (CPU, memory, etc.) of individual servers. This may be accomplished by solving the problem as the well-known Knapsack problem. Several functions are available to solve the knapsack problem. One example is disclosed by Vincent Poirriez, Nicola Yanev, Rumen Andonov (2009), "A Hybrid Algorithm for the Unbounded Knapsack Problem Discrete Optimization." In one example, for the components that remain that do not communicate much with each other (e.g., have no directed edge between each other or have a directed edge with a bandwidth less than a threshold) may be placed together if one component has a high bandwidth with other components and the other component has a low bandwidth with other components. Once component placement is determined, bandwidth may be reserved on the physical links for the components for example based on traffic distribution between VMs in a component.

Figure 4:
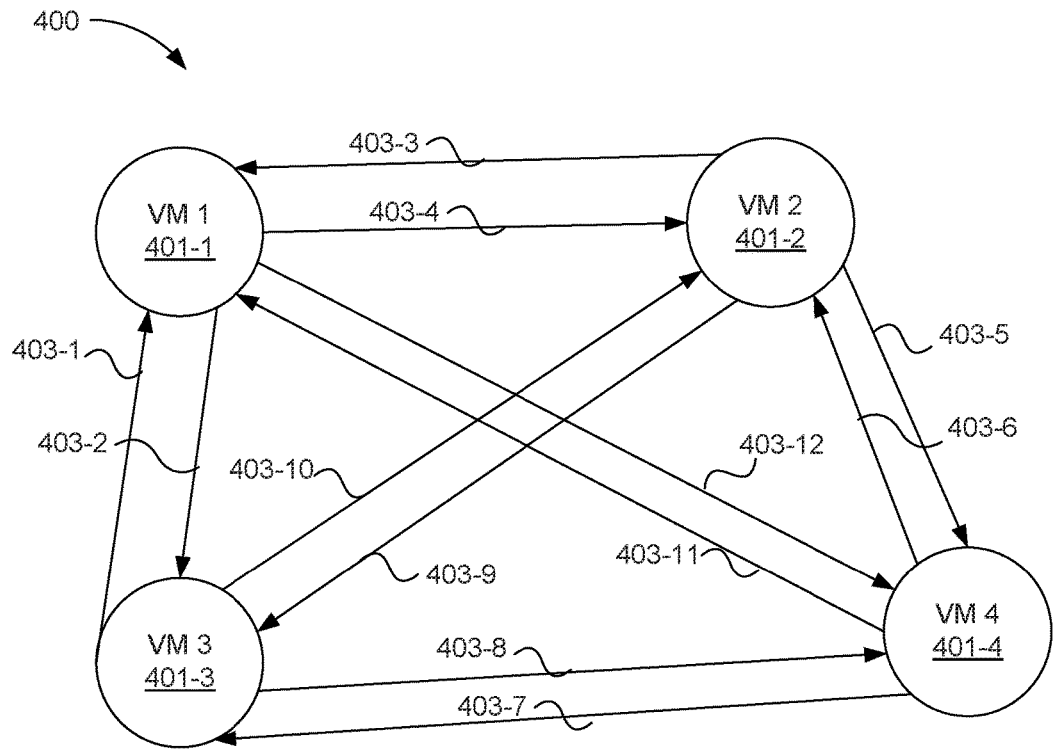
FIG. 4 is a diagram of an example of a number of virtual machines (VMs) in a component, according to one example of principles described herein.

FIG. 4 is a diagram of an example of a number of VMs in a component, according to one example of principles described herein. As mentioned above, a component may include a number of VMs. In one example, the VMs are programs running on the physical hardware but designed to emulate a specific set of hardware. In one example, several of the VMs may be placed in the physical hardware.

As illustrated in FIG. 4, the component (400) includes four VMs (401). In this example, VM1 (401-1), VM2 (401-2), VM3 (401-3), and VM4 (401-4). In one example, the arrows (403) represent data being exchanged between the VMs (401). For example, arrow 403-4 represents data being sent from Vm1 (401-1) and received by Vm2 (401-2). Further, the data being sent from Vm1 (401-1) and received by Vm2 (401-2) as indicated by arrow 403-4 may be at a rate of 1 Mbps.

As mentioned above, the identifying system (116) of FIG. 1 obtains a traffic matrix, the traffic matrix defining a rate for which packets of data are exchanged between VMs (401) corresponding to an application. In one example, the identifying system (116) of FIG. 1 uses a method such as a flow to obtain a traffic matrix where the traffic matrix defines a rate for which packets of data are exchanged between VMs (401) corresponding to the application. In another example, the identifying system (116) of FIG. 1 uses other methods to obtain a traffic matrix where the traffic matrix defines a rate for which packets of data are exchanged between VMs (401) corresponding to the application. In this example, the identifying system (116) obtains the following traffic matrix:

$$\begin{matrix} 0 & 1 & 2 & 3 \\ 1 & 0 & 2 & 3 \\ 1 & 2 & 0 & 3 \\ 2 & 2 & 3 & 0 \end{matrix} \qquad \text{(Traffic Matrix)}$$

In one example, the entries in the rows and columns represent a rate for which packets of data are exchanged between VMs (401) corresponding to the application. For example, the first row of the traffic matrix includes entries such as 0,1,2,3. In this example, the entries in the first row represents a rate for packets of data are sent from VM1 (401-1) to VM1 (401-1), VM2 (401-2), VM3 (401-3), and VM4 (401-4). For example, 0 indicates that 0 Mbps are sent from VM1 (401-1) to VM1 (401-1). 1 indicates that 1 Mbps are sent from VM1 (401-1) to VM2 (401-2). 2 indicates that 2 Mbps are sent from VM1 (401-1) to VM3 (401-3). 3 indicates that 3 Mbps are sent from VM1 (401-1) to VM1 (401-4).

Similarly, the second row of the traffic matrix represents a rate for packets of data are sent from VM2 (401-2) to VM1 (401-1), VM2 (401-2), VM3 (401-3), and VM4 (401-4). The third row of the traffic matrix represents a rate for packets of data are sent from VM3 (401-2) to VM1 (401-1), VM2 (401-2), VM3 (401-3), and VM4 (401-4). The fourth row of the traffic matrix represents a rate for packets of data are sent from VM4 (401-2) to VM1 (401-1), VM2 (401-2), VM3 (401-3), and VM4 (401-4).

Figure 5:
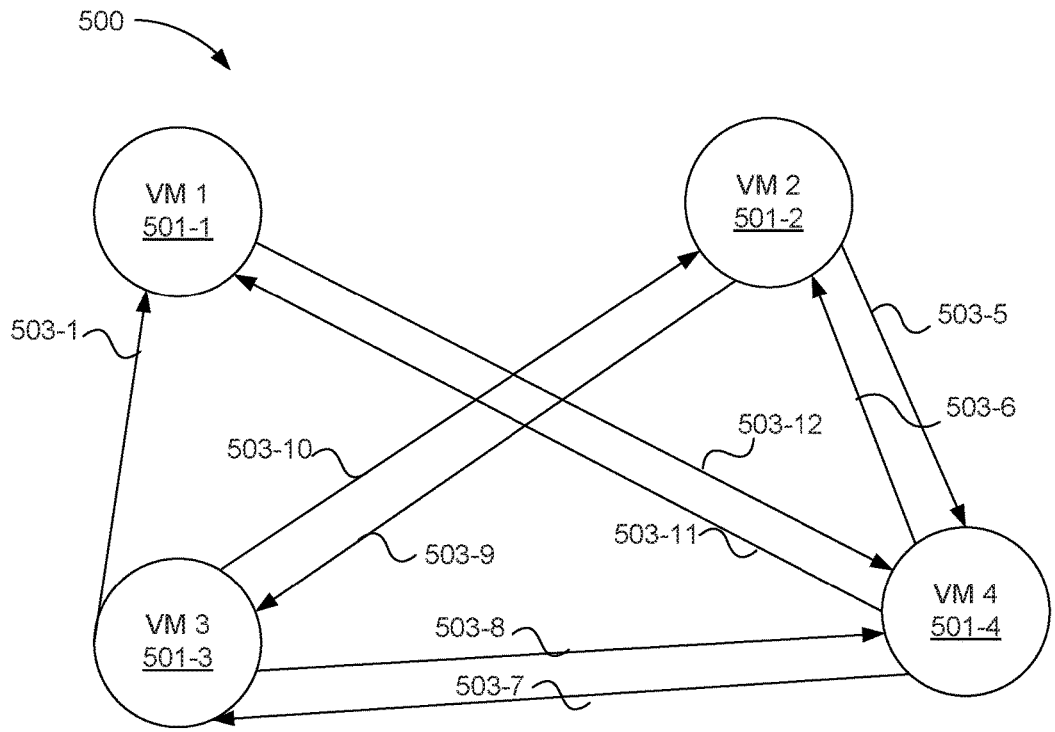
FIG. 5 is a diagram of an example of a number of VMs in a component with a threshold applied to a traffic matrix, according to one example of principles described herein.

FIG. 5 is a diagram of an example of a number of VMs in a component with a threshold applied to a traffic matrix, according to one example of principles described herein. As mentioned above, the identifying system (116) of FIG. 1 obtains a traffic matrix, the traffic matrix defining a rate for which packets of data are exchanged between VMs (401) corresponding to an application. As will be described in FIG. 5, a standard clustering mechanism is applied to the traffic matrix to create a number of to define the TAG model. In one example, a hose identification method identifies, based on the traffic matrix, groups of VMs and applies a threshold parameter to the traffic matrix to create a threshold traffic matrix.

As mentioned above, the traffic matrix correspond to FIG. 4 is defined as follows:

$$\begin{matrix} 0 & 1 & 2 & 3 \\ 1 & 0 & 2 & 3 \\ 1 & 2 & 0 & 3 \\ 2 & 2 & 3 & 0 \end{matrix} \qquad \text{(Traffic Matrix)}$$

In one example, a threshold parameter is applied to the traffic matrix to determine if the rates for which packets of data are exchanged between VMs (501) of a component (500) are significant or not significant.

In this example, a threshold parameter of one is applied to the traffic matrix. As a result, if the rates for which packets of data are exchanged between VMs (501) of a component (500) are one or less than one, the entry in the traffic matrix is replaced with 0. As illustrated in FIG. 5, after applying the threshold to the traffic matrix, the rates for which packets of data are exchanged between VM1 (501-1) and VM2 (501-2) of the component (500) are not significant. Further, the rate for which packets of data are sent from VM1 (501-1) to VM2 (501-2) of the component (500) are not significant. As a result, the threshold traffic matrix, the traffic matrix with the applied threshold, is defined as follows:

$$\begin{matrix} 0 & 0 & 2 & 3 \\ 0 & 0 & 2 & 3 \\ 0 & 2 & 0 & 3 \\ 0 & 2 & 0 & 3 \end{matrix} \qquad \text{(Threshold Traffic Matrix)}$$

Figure 6:
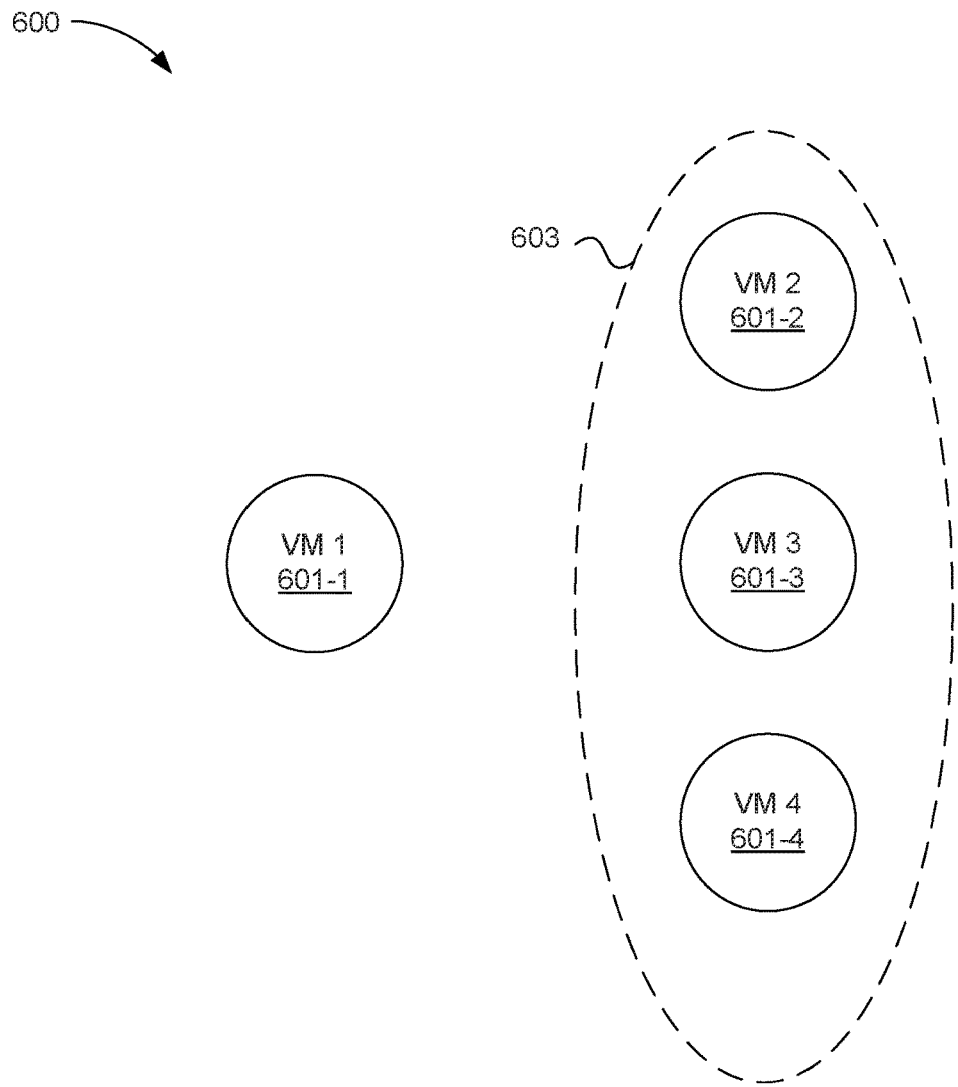
FIG. 6 is a diagram of an example of a number of VMs clustered in a clique, according to one example of principles described herein.

FIG. 6 is a diagram of an example of a number of VMs clustered in a clique, according to one example of principles described herein. As will be described in this figure as well as other parts of this specification, a hose identification method is applied to the traffic matrix to create a number of cliques. In one example, the hose identification method identifies, based on the traffic matrix groups of VMs as described in FIG. 4. The hose identification method further applies a threshold parameter to the traffic matrix to create a threshold traffic matrix as described in FIG. 5. As will be described in FIG. 6, the hose identification method creates a symmetric adjacency matrix based on the threshold traffic matrix, cubes the symmetric adjacency matrix to create the modified traffic matrix, and identifies the number of cliques to define, for the application, the TAG model based on the modified traffic matrix.

As mentioned above, the hose identification method creates a symmetric adjacency matrix based on the threshold traffic matrix. As mentioned above, the threshold traffic matrix is defined as follows:

$$\begin{matrix} 0 & 0 & 2 & 3 \\ 0 & 0 & 2 & 3 \\ 0 & 2 & 0 & 3 \\ 2 & 2 & 3 & 0 \end{matrix} \qquad \text{(Threshold Traffic Matrix)}$$

To create a symmetric adjacency matrix based on the threshold traffic matrix, an adjacency matrix is created from the threshold traffic matrix. In this example, the adjacency matrix is defined as follows:

$$\begin{matrix} 0 & 0 & 1 & 1 \\ 0 & 0 & 1 & 1 \\ 0 & 1 & 0 & 1 \\ 1 & 1 & 1 & 0 \end{matrix} \qquad \text{(Adjacency Matrix)}$$

From the adjacency matrix, a symmetric adjacency matrix may be derived. In this example, the symmetric adjacency matrix is defined as follows:

$$\begin{matrix} 0 & 0 & 0 & 1 \\ 0 & 0 & 1 & 1 \\ 0 & 1 & 0 & 1 \\ 1 & 1 & 1 & 0 \end{matrix} \qquad \text{(Symmetric Adjacency Matrix)}$$

As mentioned above, the hose identification method cubes the symmetric adjacency matrix to create the modified traffic matrix. In this example, the modified traffic matrix is defined as follows:

```
0  1  1  3         (Modified Traffic Matrix)
1  2  3  4
1  3  2  4
3  4  4  2
```

In this example, the hose identification method identifies the number of cliques to define, for the application, the TAG model. In one example, to define the TAG, the entries along the diagonal of the modified traffic matrix are analyzed to identify the number of cliques. In this example, the entries along the diagonal of the modified traffic matrix are 0, 2, 2, 2. In one example, entries with similar numbers in the diagonal of the modified traffic matrix indicate that the VMs corresponding to a clique.

As illustrated in FIG. 6, the modified traffic matrix creates a clique (603) for VM2 (601-2), VM3 (601-3) and VM4 (601-4). VM2 (601-2), VM3 (601-3) and VM4 (601-4) create the clique (603) because the entries along the diagonal of the modified traffic matrix are the same number. In this example, the entries along the diagonal for VM2 (601-2), VM3 (601-3), and VM4 (601-4) are all 2. Further, VM1 (601-1) is not included in the clique (603) because the entry along the diagonal corresponding to VM1 (601-1) is 0.

Figure 7:
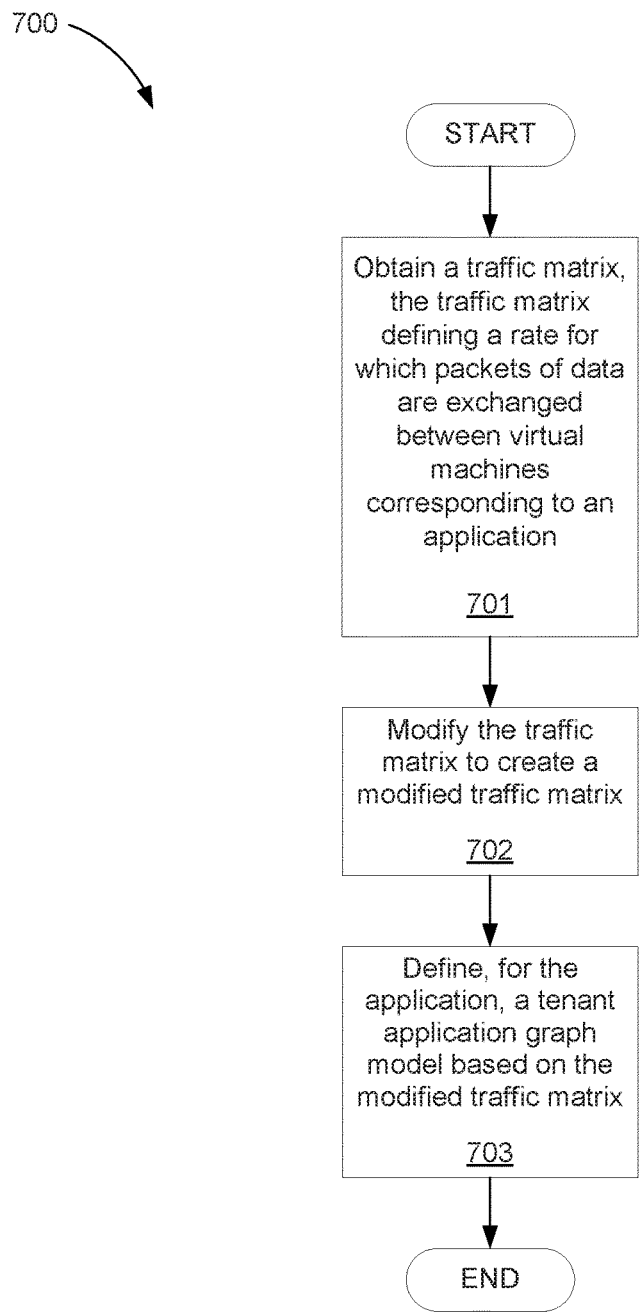
FIG. 7 is a flowchart of an example for identifying a component within an application executed in a network, according to one example of principles described herein.

FIG. 7 is a flowchart of an example for identifying a component within an application executed in a network, according to one example of principles described herein. In one example, the method (700) may be executed by the system (100) of FIG. 1. In another example, the method (700) may be executed by other systems such as system 800 of FIG. 8 or system 900 of FIG. 9. In one example, the method includes obtaining (701) a traffic matrix, the traffic matrix defining a rate for which packets of data are exchanged between VMs corresponding to an application, modifying (702) the traffic matrix to create a modified traffic matrix, and defining (703), for the application, a TAG model based on the modified traffic matrix.

As mentioned above, the method (700) includes obtaining (701) a traffic matrix, the traffic matrix defining a rate for which packets of data are exchanged between VMs corresponding to an application. In one example, a traffic matrix may be created by a number of standard network measurement functions. In one example, a standard network measurement function such as sFlow packet sampling may be used to create a traffic matrix that is obtained by the managing system (116) of FIG. 1. In another example, a standard network measurement function such as netflow may be used to create a traffic matrix that is obtained by the identifying system (116) of FIG. 1. In one example, the VMs of the traffic matrix are identified by their internet protocol (IP) address. In one example, if there are three VMs, the VM-level traffic matrix is a 3×3 matrix. In yet another example, if there are five VMs, the VM-level traffic matrix is a 5×5 matrix.

Further, each entry in the traffic matrix is a rate for which packets of data are exchanged between VMs corresponding to an application. In one example, the rate may be an average rate over a specific amount of time. In another example, the rate may be a peak rate measured over a specific amount of time. In yet another example, the rate may be an x-th percentile of the average or peak rate.

While this example has been described in reference to obtaining a traffic matrix defining a rate for which packets of data are exchanged between VMs corresponding to an application, the method may be utilized for non-virtualized systems.

As mentioned above, the components may be executed on a number of VMs. In one example, the method (700) analyzes the traffic matrix to identify the VMs within the component includes determining a structure of the component and communication patterns of the component. Some users understand the structure of the applications that they deploy in the network and are willing to share this information with the network service provider. Those users can use the TAG model specification to describe their application structure. In another example, away to learn about users' application structure is in the case when users or tenants compose their applications by using network orchestration systems, such as OpenStack, HEAT, and AWS CloudFormation. These network orchestration systems provide application templates for users to start from. The VMs created from the same template naturally form a component in the TAG.

Alternatively, there are some users or tenants who do not have information about their application structure or choose not to specify it for the network service provider. In these cases, the method (700) infers the structure and communication of the application. In some cases several or all components are identified by the user or tenant. In this case the method (700) starts from the given components and automatically identifies any other components not specified by the user or tenant.

As mentioned above, the method (700) includes modifying (702) the traffic matrix to create a modified traffic matrix. As will be described below, the traffic matrix can be modified using many techniques. Further, the techniques used to modify the traffic matrix may also be used to define a TAG model. Further, the modified traffic matrix is used to define a TAG model. As a result, more information about the modified traffic matrix will be described below.

As mentioned above, the method (700) includes defining (703), for the application, a TAG model based on the modified traffic matrix. In one example, defining, for the application, a TAG model based on the modified traffic matrix includes applying a hose identification method on the traffic matrix to create a number of cliques to define the TAG model. As mentioned above, applying the hose identification method to the traffic matrix to create a number of cliques to define the TAG model includes, identifying, based on the traffic matrix, groups of VMs. In one example, the method identifies all pairs of VMs in the group of VMs that communicate with each other. In one example, this communication pattern is represented by a hose model.

Further, the hose identification method applies a threshold parameter to the traffic matrix to create a threshold traffic matrix. The threshold parameter is used to determine if each entry in the traffic matrix is significant enough to be considered in inferring hose and/or trunk models. In one example, the default value for the threshold parameter is zero. Further, the threshold parameter may be changed at any time to accommodate a desired threshold parameter.

As mentioned above, applying the hose identification method to the traffic matrix to create a number of cliques to define the TAG model includes, identifying, based on the traffic matrix, groups of VMs. Group identification is accomplished by viewing the traffic matrix as a directed graph with weighted edges, and identifying cliques above the threshold parameter within the graph. This can be accomplished by constructing a symmetric adjacency matrix based on the threshold traffic matrix.

Further, the hose identification method cubes the symmetric adjacency matrix to create the modified traffic matrix.

Rows of the resulting matrix that have non-zero entries on the diagonal correspond to VMs that belong to a clique of three or more VMs.

Further, modifying the identification method cubes identifies the number of cliques to define the TAG model. By considering all such cliques, and cliques consisting of just single VM pairs obvious from the original traffic matrix, the hose identification method groups VMs into components represented in a TAG graph as vertices, and constructs self-loop edges representing the hose models for these components.

Further, the hose identification method constructs virtual trunks representing communication between different components. In one example, components having self-loop edges are identified. When these components, hoses, and virtual trunks are identified, the method (700) subtracts the corresponding entries from the traffic matrix to form a remainder traffic matrix for traffic that still remains to be modeled.

Further, defining, for the application, the TAG model based on the modified traffic matrix includes applying a trunk identification method to the traffic matrix to create sets of VMs having similar communication patterns to further define the TAG model. In one example, applying the trunk identification method to the traffic matrix to create the sets of VMs having the similar communication patterns includes identifying a set of VMs having the similar communication pattern and clustering the set of VMs having the similar communication pattern to a specific component to further define the TAG model. As a result, the sets of VMs having similar communication patterns to further define the TAG model may be clustered.

Defining, for the application, the TAG model based on the modified traffic matrix further includes merging a number of unassigned VMs to the number of cliques created by the hose identification method or to the sets of VMs created by the trunk identification method. At this point in the method (700), some VMs may remain unassigned because they are not part of any clique. For example, a virtual hose communication. However, the VMs may belong to other yet-identified components showing trunk communication patterns.

In one example, if any VMs remain unassigned, the method (800) creates a new component, a specific component, or combinations thereof for each of the unassigned VMs. Further, the method (700) creates virtual trunks modeling their traffic. Finally, the method (700) considers merging the single-VM with each other or with the previously identified components. For each single-VM, the method (700) considers the impact of merging the single-VM with other components. If doing so would not significantly decrease the number of virtual trunks, then the single-VM is not merged. Otherwise, the single-VM is merged with the component that would lead to the greatest reduction in the number of virtual trunks in the TAG model. For example, a component that would lead to the greatest reduction in the number of virtual trunks in the TAG model may be a new component, a specific component, previously identified components, or combinations thereof.

To find such components, the method (700) identifies a set of VMs having a similar communication pattern. For example, a set of VMs with 'similar' outgoing and incoming traffic and groups them together as a component. Two VMs have similar outgoing and incoming traffic if their corresponding rows and columns in the remainder traffic matrix have similar values in most entries. In one example, unsupervised learning clustering functions can be used to identify these sets. Once these sets are identified, the method (700) clusters the set of VMs having the similar communication pattern to a specific component. For example, the method (700) creates corresponding components and assigns the VMs to them, constructs virtual trunks between those components and subtracts their traffic from the remainder traffic matrix.

While this example has been described with reference to applying a hose identification method then a trunk identification method. The hose identification method and the trunk identification method may be applied at the same time. For example, in detecting cliques in the hose identification method, there may be a few links missing in the clique, and a small deviation can be tolerated and be able to identify a set of VMs showing similar communication patterns, though not forming a perfect clique. Such small deviations are tolerated in the trunk identification method by using unsupervised clustering techniques. However the hose function does not tolerate such small deviations. For example, consider a 50-node set with one link missing between VM one and VM two to form a clique. The hose identification method divides the entire set into two distinct components: [VM one, VM two], [the other VMs]. Because actual communication pattern in network datacenter may not follow a perfect clique pattern, it is desirable to ignore such small missing links and put all the VMs into one component.

Thus, as an alternative to executing the hose identification method and then the trunk identification method, the method (700) executes the trunk identification method with some modification to the traffic matrix. The method (700) starts by filling the diagonal entries of the original traffic matrix, to a certain value larger than the threshold parameter. Then, the rows and columns of VMs forming a clique will have non-zero values in the same set of entries indicating the traffic from/to the other VMs in the same clique. When there are a few links missing and the missing links are minor compared to the size of the network, unsupervised clustering identifies and clusters those VMs into the same clique.

Since many applications are conceptually composed of multiple components, a tenant can provide to the network bandwidth modeling and deployment system the components in an application. In one example, the tenant may be a user that has an application hosted on the network. In one example, the tenant pays the network service provider to host the application and the network service provider guarantees performance of the application, which may include bandwidth guarantees. An application bandwidth modeling module can map each component to a vertex in the TAG. The user can request bandwidth guarantees between components. The application bandwidth modeling module can model requested bandwidth guarantees between components by placing directed edges between the corresponding vertices. Each directed edge e=(u, v) from tier u to tier v is labeled with an ordered pair $(S_e, R_e)$ that represents per-VM bandwidth guarantees for the traffic, whereby the tiers are components. Specifically, each VM in component u is guaranteed bandwidth Se for sending traffic to VMs in component v, and each VM in component v is guaranteed bandwidth Re to receive traffic from VMs in component u. Two edges in opposite directions between two components can be combined into a single undirected edge when the incoming/outgoing values for each component are the same (i.e., S(u,v)=R(v,u) and R(u,v)=S(v,u)).

Having two bandwidth values for sending and receiving traffic instead of a single value for a requested bandwidth is useful when the size of the two components is different. In this way, the total bandwidth outgoing from one component and incoming to the other component can be equalized such that bandwidth is not wasted. If components u and v have sizes $N_u$ and $N_v$, respectively, then the total bandwidth guarantee for traffic sent from component u to component v is $B_{u \to v} = \min(S_e \cdot N_u, R_e \cdot N_v)$.

To model communication among VMs within a component u, the TAG allows self-loop edges of the form e=(u,u). The self-loop edges are labeled with a single bandwidth guarantee ($SR_e$). In this case, $SR_e$ represents both the sending and the receiving guarantee of one VM in that component (or vertex).

Further, the bandwidth for a virtual hose can be determined as a maximum, an average, or a X-th percentile of the maximum such as a row sum, a column sum of the VMs constituting the hose. The bandwidth of a virtual trunk can be determined as a sending bandwidth such as a maximum, an average, or a X-th percentile of the row sum of the VMs in the sending cluster. Further, the bandwidth for a virtual trunk can be determined as a receiving bandwidth such as a maximum, an average, or a X-th percentile of the column sum of the VMs in the receiving cluster.

As a result, the method (700) infers distributed application structure, communication patterns, and bandwidth from VM-to-VM traffic matrix thus enabling more efficient and simple management of network resources while providing reliable and predictable networking performance.

Figure 8:
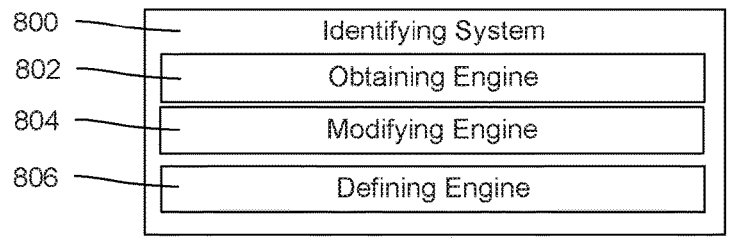
FIG. 8 is a diagram of an example of an identifying system, according to one example of principles described herein.

FIG. 8 is a diagram of an example of an identifying system, according to one example of principles described herein. The managing system (800) includes an obtaining engine (802), a modifying engine (804), and a defining engine (806). The engines (802, 804, 806) refer to a combination of hardware and program instructions to perform a designated function. Each of the engines (802, 804, 806) may include a processor and memory. The program instructions are stored in the memory and cause the processor to execute the designated function of the engine.

The obtaining engine (802) obtains a traffic matrix, the traffic matrix defining a rate for which packets of data are exchanged between VM corresponding to an application. In one example, the obtaining engine (802) obtains one traffic matrix. In another example, the obtaining engine (802) obtains several traffic matrices.

The modifying engine (804) modifies the traffic matrix to create a modified traffic matrix. In one example, the modifying engine (806) modifies one traffic matrix. In another example, the modifying engine (806) modifies several traffic matrices.

The defining engine (806) defines, for the application, a TAG model based on the modified traffic matrix. In one example, the hose identification method identifies, based on the traffic matrix, groups of VMs, applies a threshold parameter to the traffic matrix to create a threshold traffic matrix, creates a symmetric adjacency matrix based on the threshold traffic matrix, cubes the symmetric adjacency matrix to create the modified traffic matrix, and identifies the number of cliques to define the TAG model.

In one example, the trunk identification method identifies a set of VMs having a similar communication pattern and clusters the set of VMs having the similar communication pattern to a specific component to further define the TAG model. In one example, the defining engine (806) defines, for the component, one TAG model. In another example, the defining engine (806) defines, for the application, several TAG models.

Figure 9:
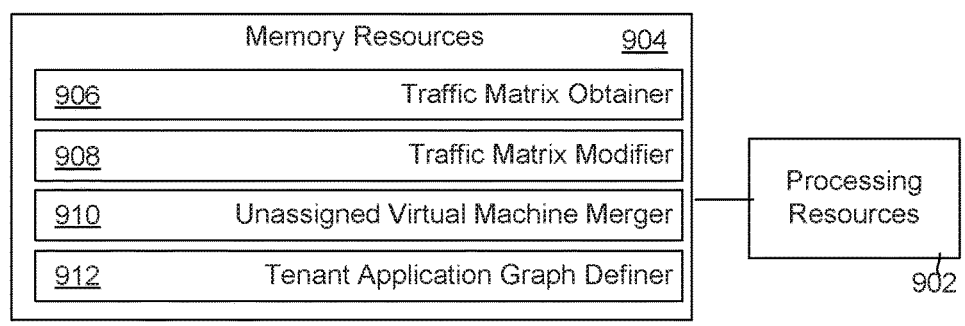
FIG. 9 is a diagram of an example of an identifying system, according to one example of principles described herein.

FIG. 9 is a diagram of an example of an identifying system (900), according to one example of principles described herein. In this example, identifying system (900) includes processing resources (902) that are in communication with memory resources (904). Processing resources (902) include at least one processor and other resources used to process programmed instructions. The memory resources (904) represent generally any memory capable of storing data such as programmed instructions or data structures used by the identifying system (900). The programmed instructions shown stored in the memory resources (904) include a traffic matrix obtainer (906), a traffic matrix modifier (908), an unassigned virtual machine merger (910), and a tenant application graph definer (912).

The memory resources (904) include a computer readable storage medium that contains computer readable program code to cause tasks to be executed by the processing resources (902). The computer readable storage medium may be non-transitory and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or other types of memory, or combinations thereof.

The traffic matrix obtainer (906) represents programmed instructions that, when executed, cause the processing resources (902) to obtain a traffic matrix defining a rate for which packets of data are exchanged between VMs corresponding to an application. The traffic matrix modifier (908) represents programmed instructions that, when executed, cause the processing resources (902) to modify the traffic matrix to create a modified traffic matrix. The unassigned virtual machine merger (910) represents programmed instructions that, when executed, cause the processing resources (902) to merge a number of unassigned VMs to a number of cliques created by the hose identification method or merge the number of unassigned VMs to a sets of VMs created by a trunk identification method to further define a TAG model. The tenant application graph definer (912) represents programmed instructions that, when executed, cause the processing resources (902) to define, for the application, a TAG model based on the modified traffic matrix.

Further, the memory resources (904) may be part of an installation package. In response to installing the installation package, the programmed instructions of the memory resources (904) may be downloaded from the installation package's source, such as a portable medium, a server, a remote network location, another location, or combinations thereof. Portable memory media that are compatible with the principles described herein include DVDs. CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (902) and the memory resources (902) are located within the same physical component, such as a server, or a network component. The memory resources (904) may be part of the physical component's main memory, caches, registers, non-volatile memory, or elsewhere in the physical component's memory hierarchy. Alternatively, the memory resources (904) may be in communication with the processing resources (902) over a network. Further, the data structures, such as the libraries, may be accessed from a remote location over a network connection while the programmed instructions are located locally. Thus, the identifying system (900) may be implemented on a user device, on a server, on a collection of servers, or combinations thereof.

The identifying system (900) of FIG. 9 may be part of a general purpose computer. However, in alternative examples, the identifying system (900) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for identifying a component within an application executed in a network, the method comprising:
    obtaining a traffic matrix, the traffic matrix defining a rate for which packets of data are exchanged between virtual machines (VMs) corresponding to an application;
    modifying the traffic matrix to create a modified traffic matrix;
    defining, for the application, a tenant application graph (TAG) model based on the modified traffic matrix; and
    merging a number of unassigned VMs to sets of VMs created by a trunk identification method to further define the TAG model;
    in which defining, for the application, the TAG model based on the modified traffic matrix comprises: applying a hose identification method to the traffic matrix to create a number of cliques to define the TAG model; and applying a trunk identification method to the traffic matrix to create sets of VMs having similar communication patterns to further define the TAG model.

2. The method of claim 1, in which applying the hose identification method to the traffic matrix to create the number of cliques based on the modified matrix to define the TAG model comprises:
    identifying, based on the traffic matrix, groups of VMs;
    applying a threshold parameter to the traffic matrix to create a threshold traffic matrix;
    creating a symmetric adjacency matrix based on the threshold traffic matrix;
    cubing the symmetric adjacency matrix to create the modified traffic matrix; and
    identifying the number of cliques to define the TAG model based on the modified traffic matrix.

3. The method of claim 1, in which applying the trunk identification method to the traffic matrix to create the sets of VMs having the similar communication patterns to further define the TAG model comprises:
    identifying a set of VMs having the similar communication pattern; and
    clustering the set of VMs having the similar communication pattern to a specific component to further define the TAG model.

4. The method of claim 1, in which defining, for the application, the TAG model based on the modified traffic matrix further comprises merging a number of unassigned VMs to the number of cliques created by the hose identification method to further define the TAG model.

5. The method of claim 1, in which defining, for the application, the TAG model based on the modified traffic matrix further comprises merging a number of unassigned VMs to the sets of VMs created by the trunk identification method to further define the TAG model.

6. A system for identifying a component within an application executed in a network, the system comprising:
    a processor coupled to a non-transitory computer readable storage medium comprising computer readable program code embodied therewith, said computer readable program code comprising program instructions that, when executed, causes the processor to:
    obtain a traffic matrix, the traffic matrix defining a rate for which packets of data are exchanged between virtual machines (VMs) corresponding to an application;
    modify the traffic matrix to create a modified traffic matrix;
    define, for the application, a tenant application graph (TAG) model based on the modified traffic matrix;
    merge a number of unassigned VMs to sets of VMs created by a trunk identification method to further define the TAG model;
    apply a hose identification method to the traffic matrix to create a number of cliques to define the TAG model; and
    apply the trunk identification method to the traffic matrix to create the sets of VMs having similar communication patterns to further define the TAG model.

7. The system of claim 6, in which the defining engine further merges a number of unassigned VMs to the number of cliques created by the hose identification method to further define the TAG model.

8. The system of claim 6, in which the hose identification method:
    identifies, based on the traffic matrix, groups of VMs;
    applies a threshold parameter to the traffic matrix to create a threshold traffic matrix;
    creates a symmetric adjacency matrix based on the threshold traffic matrix;
    cubes the symmetric adjacency matrix to create the modified traffic matrix; and
    identifies the number of cliques to define the TAG model based on the modified traffic matrix.

9. The system of claim 6, in which the trunk identification method:
    identifies a set of VMs having a similar communication pattern; and
    clusters the set of VMs having the similar communication pattern to a specific component to further define the TAG model.

10. A computer program product for identifying a component within an application executed in a network, comprising:
    a non-transitory computer readable storage medium comprising computer readable program code embodied therewith, said computer readable program code comprising program instructions that, when executed, causes a processor to:
    obtain the traffic matrix, the traffic matrix defining a rate for which packets of data are exchanged between virtual machines (VMs) corresponding to the application;
    modify a traffic matrix to create a modified traffic matrix;
    define, for an application, a tenant application graph (TAG) model based on the modified traffic matrix;
    merge a number of unassigned VMs to a number of cliques created by a hose identification method or merge the number of unassigned VMs to sets of VMs created by a trunk identification method to further define the TAG model;
    apply a hose identification method to the traffic matrix to create a number of cliques to define the TAG model; and apply a trunk identification method to the traffic matrix to create sets of VMs having similar communication patterns to further define the TAG model.

\* \* \* \* \*